(12) United States Patent
Ostrover et al.

(10) Patent No.: US 11,386,452 B1
(45) Date of Patent: *Jul. 12, 2022

(54) SYSTEMS, METHODS, AND DEVICES FOR DETERMINING PREDICTED ENROLLMENT RATE AND IMPUTED REVENUE FOR INQUIRIES ASSOCIATED WITH ONLINE ADVERTISEMENTS

(71) Applicant: CPL ASSETS, LLC, Playa Vista, CA (US)

(72) Inventors: Steven Ostrover, Los Angeles, CA (US); Jonathan Frederick Ripper, Los Angeles, CA (US)

(73) Assignee: CPL ASSETS, LLC, Playa Vista, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/117,448

(22) Filed: Dec. 10, 2020

Related U.S. Application Data

(63) Continuation of application No. 16/851,482, filed on Apr. 17, 2020, now Pat. No. 10,896,438, which is a
(Continued)

(51) Int. Cl.
*G06Q 30/00* (2012.01)
*G06Q 30/02* (2012.01)
(Continued)

(52) U.S. Cl.
CPC ....... *G06Q 30/0247* (2013.01); *G06F 16/951* (2019.01); *G06N 7/005* (2013.01)

(58) Field of Classification Search
CPC .......................... G06Q 30/0247; G06F 16/951
See application file for complete search history.

(56) References Cited

U.S. PATENT DOCUMENTS 4,787,036 A 11/1988 Fleming
6,285,987 B1 9/2001 Roth et al.
(Continued)

FOREIGN PATENT DOCUMENTS

WO WO 00/057333 9/2000
WO WO 2007/041159 4/2007

OTHER PUBLICATIONS

Borgs et al., "Dynamics of Bid Optimization in Online Advertisement Auctions," In Proceedings of International World Wide Web Conference, May 8-12, 2007.
(Continued)

*Primary Examiner* — Ilana L Spar
*Assistant Examiner* — Allan J Woodworth, II
(74) *Attorney, Agent, or Firm* — Knobbe Martens Olson & Bear LLP

(57) ABSTRACT

In one embodiment, a system for predicting imputed revenue of inquiries includes: one or more computing devices comprising computer hardware and configured to: obtain data relating to a plurality of inquiries. Each of the plurality of inquiries is (a) indicative of a request for information about one or more programs providing a service, and (b) received from a particular channel of a plurality of online channels for presenting the one or more programs. The plurality of inquiries are represented using one or more data structures in one or more data sources. The computing devices are further configured to determine a model for predicting enrollment rates of the plurality of inquiries based at least in part on historical enrollment data of at least one program of the one or more programs, the model specifying a predicted enrollment rate value for one or more characteristics associated with the plurality of inquiries. The computing devices are further configured to: using the model, determine a predicted enrollment rate for respective inquiry
(Continued)

of the plurality of inquiries; determine an imputed revenue of the respective inquiry based at least in part on the predicted enrollment rate for the respective inquiry, the imputed revenue indicative of a potential revenue that can be generated from the respective inquiry; and adjust an allocation of presentation of the one or more programs among the plurality of online channels, the adjusting based at least in part on the determined imputed revenue of the respective inquiry.

20 Claims, 6 Drawing Sheets

Related U.S. Application Data continuation of application No. 15/065,702, filed on Mar. 9, 2016, now Pat. No. 10,672,027.

(60) Provisional application No. 62/131,072, filed on Mar. 10, 2015.

(51) Int. Cl.
  *G06N 7/00* (2006.01)
  *G06F 16/951* (2019.01)

(56) References Cited

U.S. PATENT DOCUMENTS

| | | | |
|---|---|---|---|
| 7,085,740 B1 | 8/2006 | Meyers | |
| 7,096,193 B1 | 8/2006 | Beaudoin et al. | |
| 7,363,302 B2 | 4/2008 | Lester | |
| 7,792,698 B1 | 9/2010 | Veach et al. | |
| 7,801,802 B2 | 9/2010 | Walker et al. | |
| 7,865,397 B2 | 1/2011 | Makeev et al. | |
| 8,200,527 B1 | 6/2012 | Thompson et al. | |
| 8,321,279 B2 | 11/2012 | Jones et al. | |
| 8,355,926 B1 | 1/2013 | Hinz et al. | |
| 8,566,166 B1 | 10/2013 | Jones et al. | |
| 8,768,766 B2 | 7/2014 | Ellis et al. | |
| 8,775,251 B1 * | 7/2014 | Archak | G06Q 30/0275 705/14.42 |
| 10,672,027 B1 | 6/2020 | Ostrover et al. | |
| 10,896,438 B1 | 1/2021 | Ostrover et al. | |
| 2002/0116313 A1 | 8/2002 | Detering | |
| 2003/0135460 A1 | 7/2003 | Talegon | |
| 2003/0149937 A1 | 8/2003 | McElfresh et al. | |
| 2006/0122879 A1 | 6/2006 | O'Kelley | |
| 2006/0184421 A1 | 8/2006 | Lipsky et al. | |
| 2006/0259360 A1 | 11/2006 | Flinn et al. | |
| 2007/0022011 A1 | 1/2007 | Altberg et al. | |
| 2007/0038514 A1 | 2/2007 | Patterson et al. | |
| 2007/0061488 A1 | 3/2007 | Alagappan et al. | |
| 2007/0100708 A1 | 5/2007 | Smith et al. | |
| 2007/0299682 A1 | 12/2007 | Roth et al. | |
| 2008/0052195 A1 | 2/2008 | Roth et al. | |
| 2008/0059300 A1 | 3/2008 | Hamoui | |
| 2008/0059361 A1 | 3/2008 | Roth et al. | |
| 2008/0059362 A1 | 3/2008 | Roth et al. | |
| 2008/0103886 A1 | 5/2008 | Li et al. | |
| 2008/0126238 A1 | 5/2008 | Banbury et al. | |
| 2008/0183675 A1 | 7/2008 | Schwarz | |
| 2008/0201227 A1 | 8/2008 | Bakewell et al. | |
| 2008/0208841 A1 | 8/2008 | Zeng et al. | |
| 2008/0249855 A1 | 10/2008 | Collins et al. | |
| 2008/0255915 A1 | 10/2008 | Collins et al. | |
| 2008/0255922 A1 | 10/2008 | Feldman et al. | |
| 2008/0262917 A1 | 10/2008 | Green et al. | |
| 2008/0275777 A1 | 11/2008 | Protheroe et al. | |
| 2008/0288344 A1 | 11/2008 | Thrall | |
| 2009/0037317 A1 | 2/2009 | Zhou et al. | |
| 2009/0055268 A1 | 2/2009 | Knoller et al. | |
| 2009/0099909 A1 | 4/2009 | Phan | |
| 2009/0106094 A1 | 4/2009 | DeLine et al. | |
| 2009/0164300 A1 | 6/2009 | Gupta et al. | |
| 2009/0171710 A1 | 7/2009 | Shrivathsan et al. | |
| 2009/0171721 A1 | 7/2009 | LeBaron et al. | |
| 2009/0216642 A1 | 8/2009 | Ho et al. | |
| 2009/0234734 A1 | 9/2009 | Gollapudi et al. | |
| 2009/0248534 A1 | 10/2009 | Dasdan et al. | |
| 2010/0042421 A1 | 2/2010 | Bai et al. | |
| 2010/0088373 A1 | 4/2010 | Pinkham | |
| 2010/0114654 A1 * | 5/2010 | Lukose | G06Q 30/0256 705/14.54 |
| 2010/0211455 A1 * | 8/2010 | Williams | G06Q 30/0243 705/14.42 |
| 2010/0228635 A1 | 9/2010 | Ghosh et al. | |
| 2010/0262497 A1 | 10/2010 | Karlsson | |
| 2011/0016408 A1 | 1/2011 | Grosz et al. | |
| 2011/0071900 A1 * | 3/2011 | Kamath | G06Q 30/0275 705/14.46 |
| 2011/0238487 A1 | 9/2011 | Chang et al. | |
| 2012/0310729 A1 | 12/2012 | Daito et al. | |
| 2013/0110640 A1 | 5/2013 | Powell et al. | |
| 2014/0058872 A1 * | 2/2014 | Sandholm | G06Q 30/0601 705/26.1 |
| 2014/0156379 A1 | 6/2014 | Pani et al. | |
| 2014/0188593 A1 * | 7/2014 | Sun | G06Q 30/0256 705/14.41 |
| 2014/0195398 A1 | 7/2014 | Rose et al. | |
| 2014/0249872 A1 | 9/2014 | Stephan et al. | |
| 2014/0279055 A1 | 9/2014 | Jones et al. | |
| 2014/0325055 A1 | 10/2014 | Oh et al. | |
| 2015/0220939 A1 * | 8/2015 | Tay | G06Q 30/0201 705/7.29 |
| 2020/0302484 A1 * | 9/2020 | Sears | G06Q 30/0277 |

OTHER PUBLICATIONS

"Revenue", dictionary.com definition as obtained from https://www.dictionary.com/browse/revenue on Nov. 23, 2021 in 7 pages.

* cited by examiner

SYSTEMS, METHODS, AND DEVICES FOR DETERMINING PREDICTED ENROLLMENT RATE AND IMPUTED REVENUE FOR INQUIRIES ASSOCIATED WITH ONLINE ADVERTISEMENTS

CROSS-REFERENCE TO RELATED APPLICATIONS

This application is a continuation of U.S. patent application Ser. No. 16/851,482, filed Apr. 17, 2020 and titled SYSTEMS, METHODS, AND DEVICES FOR DETERMINING PREDICTED ENROLLMENT RATE AND IMPUTED REVENUE FOR INQUIRIES ASSOCIATED WITH ONLINE ADVERTISEMENTS, which is a continuation of U.S. patent application Ser. No. 15/065,702, filed Mar. 9, 2016, now U.S. Pat. No. 10,672,027, issued Jun. 2, 2020, and titled SYSTEMS, METHODS, AND DEVICES FOR DETERMINING PREDICTED ENROLLMENT RATE AND IMPUTED REVENUE FOR INQUIRIES ASSOCIATED WITH ONLINE ADVERTISEMENTS, which claims the benefit of priority under 35 U.S.C. 119(e) to U.S. Provisional Application No. 62/131,072, filed Mar. 10, 2015 and titled SYSTEM AND METHOD FOR DETERMINING IMPUTED REVENUE, which are all hereby incorporated herein by reference in their entirety. Any and all priority claims identified in the Application Data Sheet, or any correction thereto, are hereby incorporated by reference under 37 CFR 1.57.

BACKGROUND

Organizations and/or companies may allocate advertisements among various media channels, such as social media websites, portal websites, etc. Inquiries may be generated when users click on the advertisements.

SUMMARY

The systems, methods, and devices described herein each have several aspects, no single one of which is solely responsible for its desirable attributes. Without limiting the scope of this disclosure, several non-limiting features will now be discussed briefly.

In one embodiment, a system for predicting imputed revenue of inquiries, the system includes: one or more computing devices comprising computer hardware and configured to: obtain data relating to a plurality of inquiries, each of the plurality of inquiries indicative of a request for information about one or more programs providing a service, each of the plurality of inquiries received from a particular channel of a plurality of online channels for presenting the one or more programs, the plurality of inquiries represented using one or more data structures in one or more data sources; determine a model for predicting enrollment rates of the plurality of inquiries based at least in part on historical enrollment data of at least one program of the one or more programs, the model specifying a predicted enrollment rate value for one or more characteristics associated with the plurality of inquiries; using the model, determine a predicted enrollment rate for respective inquiry of the plurality of inquiries; determine an imputed revenue of the respective inquiry based at least in part on the predicted enrollment rate for the respective inquiry, the imputed revenue indicative of a potential revenue that can be generated from the respective inquiry; and adjust an allocation of presentation of the one or more programs among the plurality of online channels, the adjusting based at least in part on the determined imputed revenue of the respective inquiry.

According to certain aspects, the model is a decision tree model comprising a plurality of items, each of the plurality of items associated with one or more characteristics of the plurality of inquiries, each of the plurality of items specifying respective predicted enrollment rate value for the associated one or more characteristics.

According to certain aspects, the one or more computing devices are further configured to: assign the respective inquiry to one item in the decision tree model; and assign the predicted enrollment value specified by the one item as the predicted enrollment rate of the respective inquiry.

According to certain aspects, the one or more computing devices are further configured to assign the respective inquiry to the one item based at least in part on classification rules associated with the model.

According to certain aspects, the plurality of items comprise a plurality of nodes and a plurality of segments, wherein each node specifies the predicted enrollment rate value for a group of characteristics associated with the plurality of inquiries, wherein each segment specifies the predicted enrollment rate value for a particular characteristic associated with the plurality of inquiries, and wherein the plurality of nodes are at a higher level in the decision tree model than the plurality of segments.

According to certain aspects, historical enrollment data is available for a first program of the one or more programs and historical enrollment data is not available for a second program of the one or more programs, and wherein the one or more computing devices are further configured to: assign a segment of the plurality of segments to a first inquiry associated with the first program; and assign a node of the plurality of nodes to a second inquiry associated with the second program.

According to certain aspects, the one or more computing devices are further configured to: assign the predicted enrollment rate value specified by the assigned segment as the predicted enrollment rate of the first inquiry; and assign the predicted enrollment rate value specified by the assigned node as the predicted enrollment rate of the second inquiry.

According to certain aspects, the plurality of online channels include one or more of: social media and search engine.

According to certain aspects, the historical enrollment data of the at least one program is available up to a first time and the imputed revenue of the respective inquiry is determined at a second time, wherein the second time is later than the first time. According to certain aspects, each of the plurality of inquiries is associated with a quality level indicative of a likelihood of enrollment in a program, and wherein the quality level has an enrollment rate associated with the quality level.

According to certain aspects, the one or more computing devices are further configured to determine the imputed revenue of the respective inquiry based on an actual revenue associated with the respective inquiry, the predicted enrollment rate of the respective inquiry, and the enrollment rate of the quality level associated with the respective inquiry.

In another embodiment, a computer-implemented method includes: under control of one or more computing devices configured with specific computer-executable instructions, obtaining data relating to a plurality of inquiries, each of the plurality of inquiries indicative of a request for information about one or more programs providing a service, each of the plurality of inquiries received from a particular channel of a plurality of online channels for presenting the one or more programs, the plurality of inquiries represented using one or more data structures in one or more data sources; determining a model for predicting enrollment rates of the plurality of inquiries based at least in part on historical enrollment data of at least one program of the one or more programs, the model specifying a predicted enrollment rate value for one or more characteristics associated with the plurality of inquiries; using the model to determine a predicted enrollment rate for respective inquiry of the plurality of inquiries; determining an imputed revenue of the respective inquiry based at least in part on the predicted enrollment rate for the respective inquiry, the imputed revenue indicative of a potential revenue that can be generated from the respective inquiry; and adjusting an allocation of presentation of the one or more programs among the plurality of online channels, the adjusting based at least in part on the determined imputed revenue of the respective inquiry.

According to certain aspects, the model is a decision tree model comprising a plurality of items, each of the plurality of items associated with one or more characteristics of the plurality of inquiries, each of the plurality of items specifying respective predicted enrollment rate value for the associated one or more characteristics.

According to certain aspects, the method also includes: assigning the respective inquiry to one item in the decision tree model; and assigning the predicted enrollment value specified by the one item as the predicted enrollment rate of the respective inquiry.

According to certain aspects, the method also includes assigning the respective inquiry to the one item based at least in part on classification rules associated with the model.

According to certain aspects, the plurality of items comprises a plurality of nodes and a plurality of segments, wherein each node specifies the predicted enrollment rate value for a group of characteristics associated with the plurality of inquiries, wherein each segment specifies the predicted enrollment rate value for a particular characteristic associated with the plurality of inquiries, and wherein the plurality of nodes are at a higher level in the decision tree model than the plurality of segments.

According to certain aspects, historical enrollment data is available for a first program of the one or more programs and historical enrollment data is not available for a second program of the one or more programs, and the method further includes: assigning a segment of the plurality of segments to a first inquiry associated with the first program; and assigning a node of the plurality of nodes to a second inquiry associated with the second program.

According to certain aspects, the method also includes: assigning the predicted enrollment rate value specified by the assigned segment as the predicted enrollment rate of the first inquiry; and assigning the predicted enrollment rate value specified by the assigned node as the predicted enrollment rate of the second inquiry.

According to certain aspects, the plurality of online channels include one or more of: social media and search engine. According to certain aspects, the method also includes determining the imputed revenue of the respective inquiry based on an actual revenue associated with the respective inquiry, the predicted enrollment rate of the respective inquiry, and the enrollment rate of the quality level associated with the respective inquiry.

DETAILED DESCRIPTION

Figure 1:
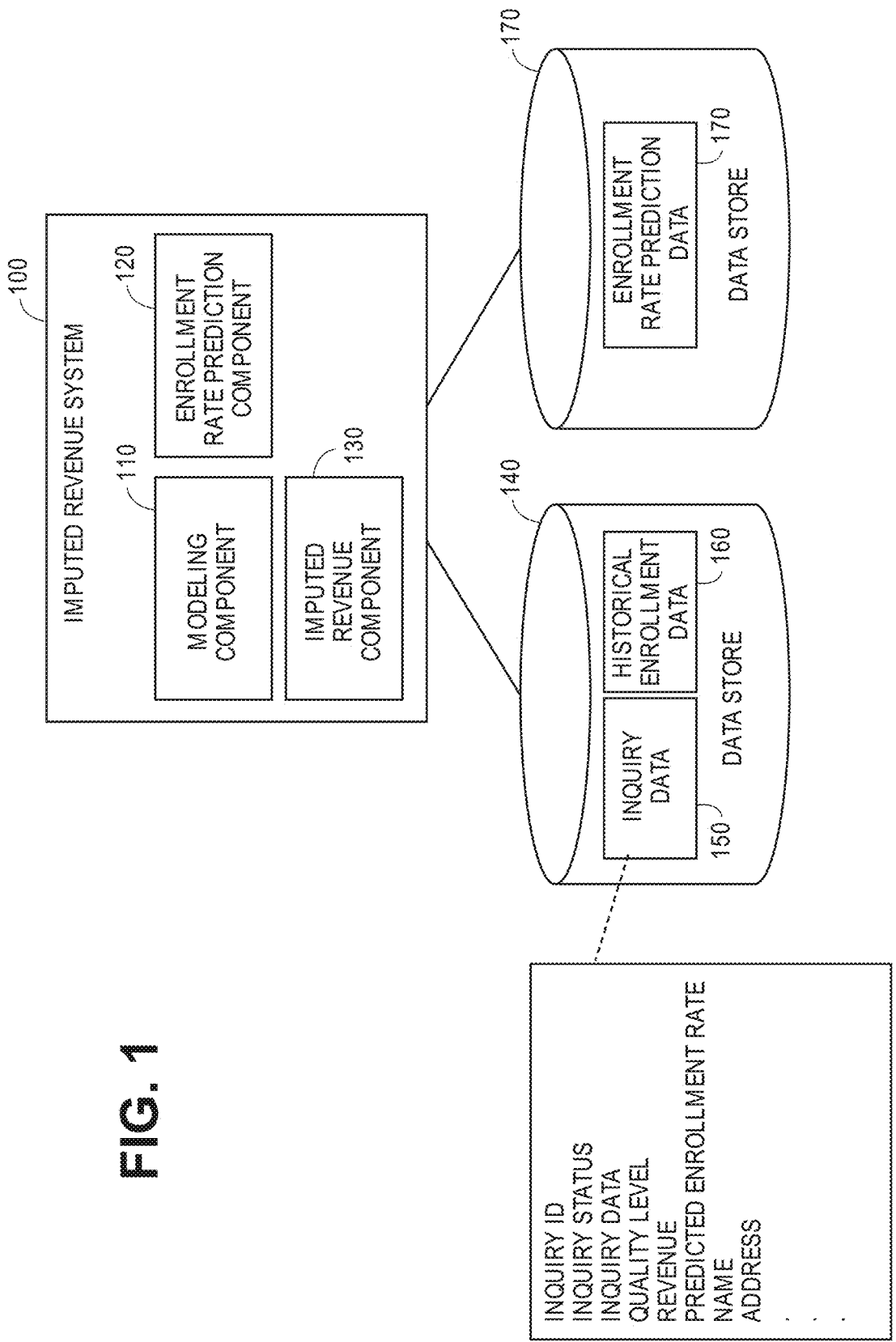
FIG. 1 is a block diagram illustrating an exemplary system for determining imputed revenue associated with inquiries, according to certain embodiments.

Organizations or companies may wish to place advertisements ("ads") about programs they offer among various media channels. In some cases, organizations or companies may use a third party service or system that manages the purchase of and/or allocation of advertisements in different media channels. For example, a third party service or system can decide, on behalf of organizations or companies, which media channels to purchase advertisements for, how to allocate advertisements among different media channels, how many advertisements to purchase, etc. Examples of media channels can include social media websites, portal websites, search websites, mobile apps, etc. Media channels in this disclosure sometimes relate to online media channels, but can also include offline media channels, depending on the embodiment. According to certain aspects, entities (e.g., organizations or companies) that purchase advertisements through a third party service or system may also be referred to as "partners."

Advertisements can appear in various channels and may relate to products, services, programs, etc. When a user clicks on an ad, a form may appear for the user to fill out to receive more information about products, services, programs, etc. associated with the ad. When the user fills out and submits the form, an inquiry can be generated and sent to the third party system. According to certain aspects, an inquiry can refer to a request to obtain information about a product, service, program, etc. associated with the advertisement. In some embodiments, advertisements may be for educational programs (e.g., test preparation, online university, etc.). When a user clicks on an ad, the user may see a form that includes various fields that are relevant for matching the user to available educational programs. An inquiry is generated when the user fills out the various fields in the form and submits the form. A list of one or more educational programs that match the criteria the user entered may be shown or sent to the user.

In certain cases, organizations or companies may request the third party system to deliver leads that meet a certain quality level, e.g., leads that are highly likely to enroll in programs associated with the ads, complete transactions associated with the ads, etc. However, enrollment in a program generally does not occur in real time, especially in the education context. For example, there is usually a time gap between when a user fills out the form for an ad and when the user enrolls in an associated program. Accordingly, it may be advantageous to provide a way of determining likelihood of enrollment for different inquiries.

In order to address these and other challenges, a system according to certain aspects may predict enrollment rates for inquiries and determine imputed revenue for inquiries using the predicted enrollment rates. The system can generate a model for predicting enrollment rates. In some embodiments, the model can be generated based at least in part on historical enrollment data. For example, some educational institutions may provide data relating to which inquiries actually led to enrollment. Such data can be used to generate the model used to predict enrollment rates. Using the model, the system may determine predicted enrollment rates for inquiries having one or more characteristics, e.g., inquiries received within a particular time window. The system can use the predicted enrollment rates for inquiries to determine imputed revenue for inquiries. According to certain aspects, imputed revenue may refer to potential revenue that may be generated by the sale of an inquiry. The imputed revenue for inquiries can be considered in purchase and/or allocation of advertisements among various media channels.

Because the system generally does not have real-time information on whether a particular inquiry leads to a sale or an actual enrollment in a program, it can be difficult to determine whether a particular inquiry meets a certain quality level (e.g., a certain level of likelihood of sale or enrollment). By determining predicted enrollment rates for inquiries and imputed revenues based on the predicted enrollment rates, the system can provide information that can be used to purchase and/or allocate advertisements in different media channels.

Imputed Revenue System

FIG. 1 is a block diagram illustrating an exemplary system 100 for determining imputed revenue associated with inquiries, according to certain embodiments. The system 100 may also be referred to as the "imputed revenue system." The system 100 may include a modeling component 110, enrollment rate prediction component 120, and an imputed revenue component 130. The system 100 may include or may communicate with one or more data stores 140. The one or more data stores 140 may store inquiry data 150 and/or historical enrollment data 160. Various components of the system 100, such as the modeling component 110, enrollment rate prediction component 120, and an imputed revenue component 130, may reside on the same computing device or different computing devices, depending on the embodiment. In some embodiments, two or more of the modeling component 110, enrollment rate prediction component 120, and an imputed revenue component 130 are combined and implemented as one component. The system 100 can include additional or different components, depending on the embodiment.

The modeling component 110 may generate and/or deploy a model for predicting enrollment rates of inquiries. The enrollment rate prediction component 120 can determine predicted enrollment rates for inquiries, for example, using the model. The imputed revenue component 130 130 can determine imputed revenue for inquiries, for example, using the predicted enrollment rates. The system 100 may include one or more data stores 140 or may be connected to one or more data stores 140. In some embodiments, the data stores 140 can include databases, enterprise data warehouse ("EDW"), etc. Various types of data relating to predicting enrollment rates and/or determining imputed revenue may be stored in the data stores 140.

The system 100 may obtain or receive inquiry data 150, for example, from the entities associated with media channels. The inquiry data 150 can include values for various fields that are displayed in a form shown to the user when the user clicks on an ad. For example, for an education program, the inquiry data 150 may include one or more of: name, address, email address, phone number, age range, interest in financial aid, U.S. citizenship/permanent residence, military affiliation, program level (e.g., undergraduate, graduate, etc.), area of interest (e.g., business, art, etc.). As mentioned above, the various fields in the form may relate to criteria or factors that can be used in matching the user to education programs. The inquiry data 150 can also include information such as inquiry ID, inquiry status (e.g., eligible, ineligible, etc.), inquiry date, quality level, revenue, predicted enroll rate, media type (e.g., social media, search, etc.), device type (e.g., desktop/laptop, mobile device, etc.).

Ineligible inquiries may refer to inquiries that are not reliable, such as inquiries missing information used in predicting enrollment rates, inquiries that were not filled out by a person (e.g., filled out by a bot), etc. Eligible inquiries can refer to all inquiries other than ineligible inquiries.

Quality level can refer to a category or type of lead that indicates a likelihood of enrollment. For example, the system 100 can provide two types of leads to organizations or companies: leads that are likely to lead to enrollment as a first type ("EQ") and leads that are less likely to lead to enrollment as a second type ("SP"). The quality level categories may be based on historical data. For example, inquiries generated from banner advertisements generally have a lower likelihood of enrollment than inquiries generated from search engine advertisements. The inquiries from the banner advertisements can be assigned the quality level SP, and the inquiries from the search engine advertisements can be assigned the quality level EQ. In some cases, the types or categories of quality level can be further divided based on other attributes relating to the programs. In the education context, historical enrollment may differ depending on whether a program is undergraduate or graduate. In such case, the quality levels may include EQ-Undergraduate, EQ-Graduate, SP-Undergraduate, and SP-Graduate. Revenue may refer to the actual revenue generated by the sale of an inquiry or the imputed revenue determined by the system 100, depending on whether the inquiry is eligible or ineligible. The inquiry data 150 may be stored or represented using one or more data structures, data objects, etc.

The system 100 may also obtain or receive historical enrollment data 160 ("HED"). Some educational institutions may provide historical enrollment data, which indicates whether users associated with inquiries actually enrolled in programs associated with the inquiries. In some embodiments, the HED 160 indicates for each inquiry ID whether the user enrolled in a corresponding program or not. The HED 160 may not be available to the system 100 immediately. For example, there may be a 60-day gap or delay between the time when an inquiry is generated and the time when the enrollment status of the inquiry is available to the system 100. Although the enrollment status of an inquiry is not available in real-time or immediately after the inquiry is generated, the subsequent enrollment status information can be helpful in generating a model for predicting enrollment rates. For example, the system 100 can evaluate whether a particular model provides predicted enrollment rates that are close to the actual enrollment rates. In some embodiments, the HED 160 may be referred to as "closed loop data" since it provides information on whether the enrollment was "closed" or not.

The system 100 can also generate and store enrollment rate prediction data 170. The enrollment rate prediction data 170 may include predicted enrollment rates for various inquiries. Certain details relating to the enrollment rate prediction data 170 are explained below, e.g., in connection with FIG. 4.

Although education programs are used in the disclosure for illustrative purposes, the techniques described in this disclosure can apply to any other programs, products, services, etc. For example, advertisements can relate to mortgages, and the enrollment rate can indicate whether the user actually signed up for a mortgage or not. In other embodiments, advertisements can relate to products, and the enrollment rate can indicate whether the user actually purchased the product or not. Some additional examples of programs, products, services, etc. include loans, insurance policies, and so forth.

Model Generation and Deployment

Figure 2:
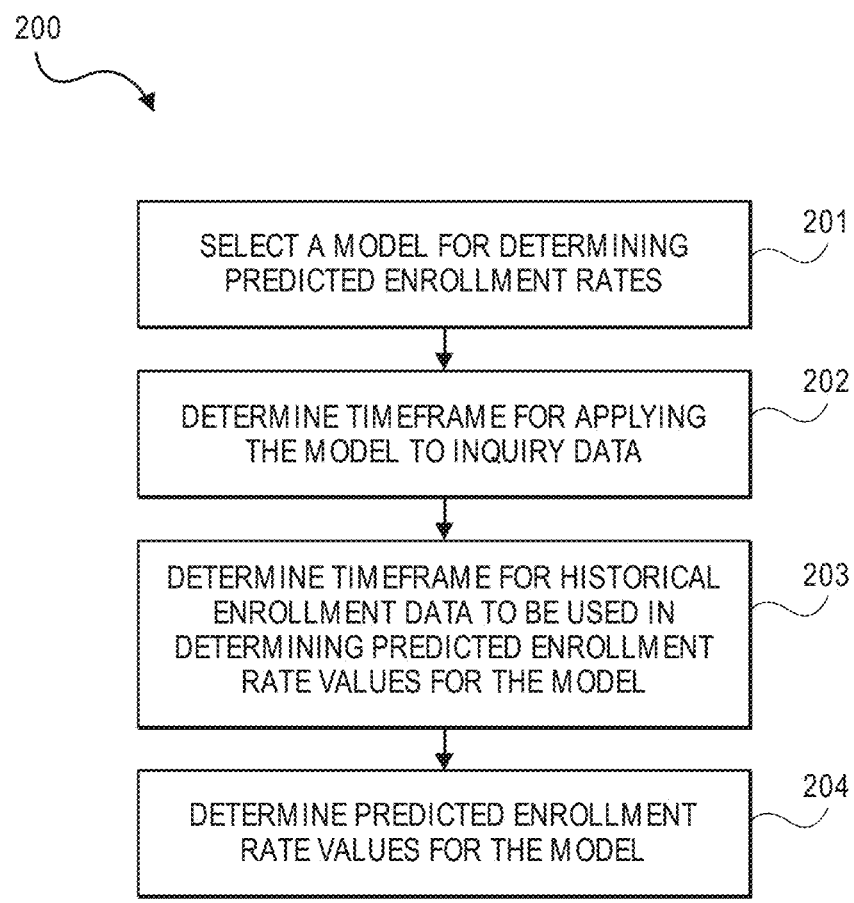
FIG. 2 illustrates a flowchart for generating a model for determining predicted enrollment rates associated with inquiries, according to certain embodiments.

FIG. 2 illustrates a flowchart for generating a model for determining predicted enrollment rates associated with inquiries, according to certain embodiments. The process 200 may be implemented by one or more systems described with respect to FIGS. 1 and 7. For illustrative purposes, the process 200 is explained below in connection with the system 100 in FIG. 1. For example, the modeling component 110 of the system 100 may perform the blocks for the process 200. Certain details relating to the process 200 are explained in more detail with respect to FIGS. 1-7. Depending on the embodiment, the process 200 may include fewer or additional blocks, and the blocks may be performed in an order that is different than illustrated.

At block 201, the system 100 selects a model for determining predicted enrollment rates. A variety of model types may be used. For example, a decision tree model, a random forest model, regression model, classification model, regression tree model, neural network, etc. may be utilized. In one embodiment, model validation is performed by splitting one large data set into two data sets (training data set and test data set), and then running each through the model and then measuring the differences. In one embodiment, model comparison is performed by running one large data set through two different models. The determination as to which is the better model may be performed by calculating either the squared error or absolute error, etc. In some embodiments, a user associated with the system 100 may select the model manually. A model can be generated using a modeling tool. Some of the steps included in generating and/or selecting a model(s) may include one or more of the following:

- specify data for modeling (e.g., training data)
- identify one or more modeling algorithms or processes
- apply the modeling algorithms or processes to the specified data (e.g., training data)
- modify/manipulate the modeling algorithms or processes to produce forecast or prediction that conforms to or approximates actual historical performance
- select a modeling algorithm or process to apply to test data
- validate and compare performance of the selected modeling algorithm or process on the training data vs. test data
- establish optimal tuning for the selected modeling algorithm or process
- prepare the selected model for deployment.

A model may be used to determine predicted enrollment rates for inquiries. For instance, a model can assign a predicted enrollment rate to each inquiry. The process of assigning a predicted enrollment rate to an inquiry may be referred to as "scoring." A model can specify predicted enrollment rate values ("PER values") for a particular characteristic or a group of characteristics associated with inquiries. For example, a model specifies a predicted enrollment rate value for the characteristic "social media," a predicted enrollment rate value for the characteristic "mobile device," etc. The PER values may also be referred to as "forecast values." In some embodiments, a model can be a decision tree, for example, as explained in connection with FIG. 3 below.

At block 202, the system 100 determines a timeframe for applying the model to inquiry data. For example, if a model is being applied for the first time, it may be desirable to determine predicted enrollment rates for past inquiry data. Similarly, if a new model is selected and deployed, it may be desirable to recalculate the predicted enrollment rates for past inquiry data. In one example, the timeframe may be the past 7 days. Any amount of time or number of days can be used, as desired.

At block 203, the system 100 determines a timeframe for historical enrollment data ("HED") to be used in determining predicted enrollment rate values for the model. HED can be used to determine the predicted enrollment rate values in the model. For example, HED can be used to determine predicted enrollment rate values for various characteristics associated with inquiries. Because historical enrollment data is provided at a later time than when the inquiries are received, the system 100 may keep track of the time period that it takes for the historical enrollment data to become complete, e.g., include actual enrollment data, etc. For instance, if historical enrollment data is received after 60 days from the date inquiries are generated, the time period is 60 days. According to certain aspects, this time period may be referred to as the "gap." Any portion of the historical enrollment data may be used in determining the predicted enrollment rate values in the model.

The timeframe for historical enrollment data may be a fixed window or an increasing window. The fixed window can be a fixed period of time (e.g., 6 months, 1 year, etc.) such that most recent historical enrollment data falling within the fixed window is used in determining the PER values for the model. The increasing window can be an increasing period of time (e.g., a date range, etc.) such that newly obtained historical enrollment data can be considered in determining the PER values for the model. In certain embodiments, the fixed window may be referred to as a "roll window," and the increasing window may be referred to as an "append window." In one embodiment, the system 100 can indicate the initial date and the end date for the timeframe specifying the portion of the historical enrollment data to be used, and the system 100 can specify whether to update the timeframe by rolling or appending. Under the rolling update option, the initial date and the end date are both moved, and under the appending update option, the initial date remains the same and the end date is extended.

At block 204, the system 100 determines predicted enrollment rate values for the model. Using the HED, the system 100 determines or calculates the predicted enrollment rate values for various characteristics associated with inquiries. In certain embodiments, the characteristics may correspond to variables used by a matching engine. The variables used by the matching engine may be referred to as "matching engine variables." A matching Engine is an application that receive inputs reflecting client/partner/school demand. Demand, for example, can represent a specific type of customer characteristics a school wishes to purchase, and the volume. Each customer who completes the process becomes an inquiry and one or more leads, for example, depending on whether the customer is matched to more than one school. When a customer goes through the process, the customer enters information about him or herself ("characteristics"). The matching engine application performs a look up of the schools matched to those characteristics and determines which schools are eligible to be presented to that customer. Based on the matching engine look up (sometimes referred to as a "run"), the results are shown to the customer. The customer may then select specific schools before completing the process and becoming a complete inquiry. In this manner, a matching engine may match a user with one or more programs and use matching engine variables in the matching process. Examples of matching engine variables can include media type (e.g., social media, search, etc.), device type (e.g., desktop, laptop, mobile, etc.). In the education context, matching engine variables can also include educational institute type (e.g., one that provides HED, one that does not provide HED, etc.), location preference (e.g., campus, online, etc.), desired enrollment timeframe (e.g., within 0-3 months, within 4-12 months, etc.), etc. Matching engine variables may also include variables corresponding to the fields that are included in the form shown to the user when the user clicks on the advertisement.

Input data for the model, such as independent variables that contribute to predicting an outcome, can be selected as appropriate. Also, time variables that influence model performance may be selected as appropriate (e.g., timeframe for applying the model to inquiry data, timeframe for historical enrollment data, etc.).

Exemplary Decision Tree Model

Figure 3:
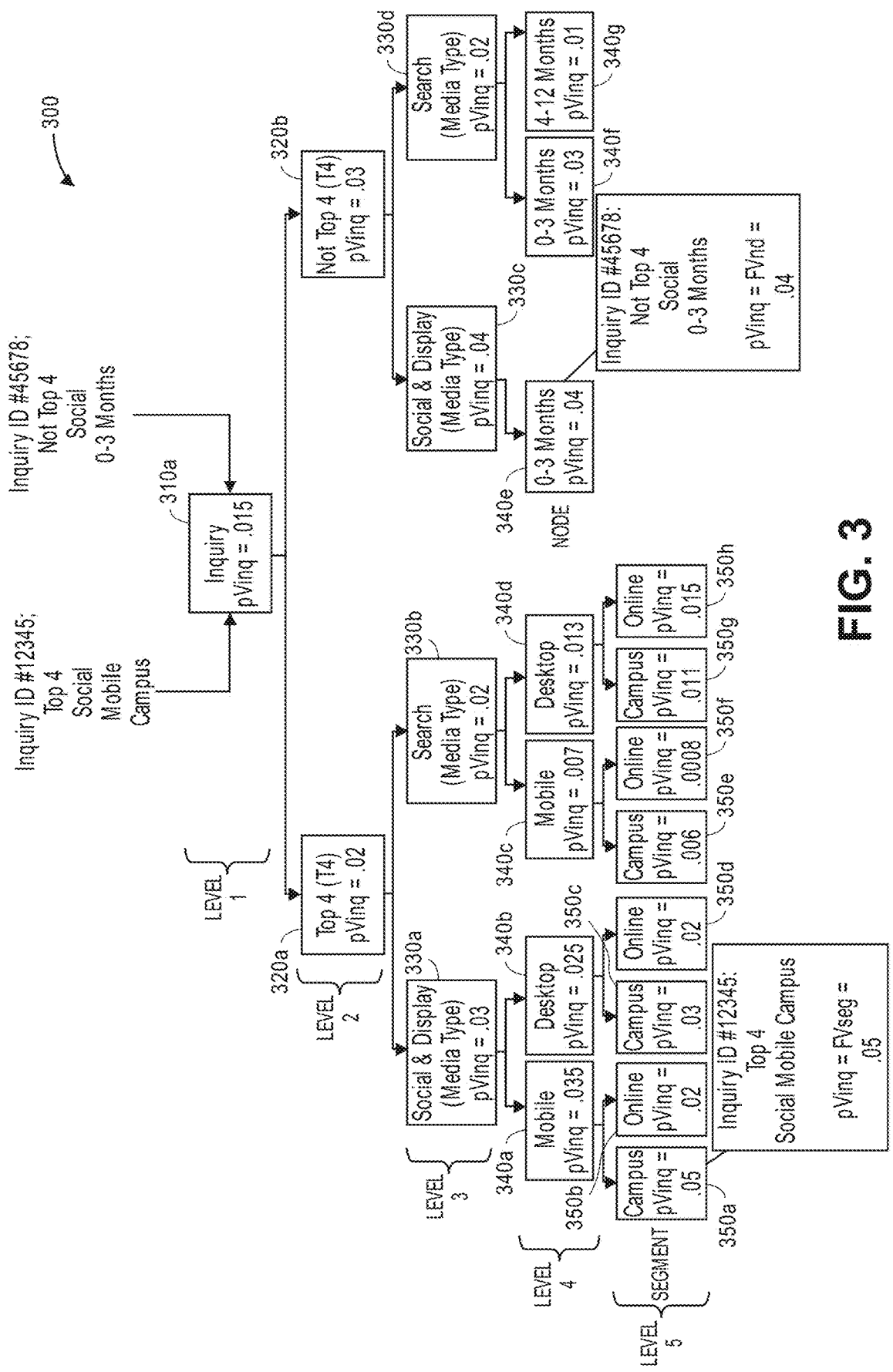
FIG. 3 is a block diagram illustrating an exemplary model, according to certain embodiments.

FIG. 3 is a block diagram illustrating an exemplary model 300, according to certain embodiments. FIG. 3 shows a decision tree model for illustrative purposes, but any type of model can be used. A single decision tree or multiple decision trees may be used, depending on the embodiment. In some embodiments, a random forest model is used. The system 100 can modify and adjust various factors in generating the model, for example, in order to define or determine a model that best fits a data set. For example, in a decision tree, there are many parameters that can influence the model's performance. These parameters include, but are not limited to, splitting criterion, minimum number of observations for a leaf, maximum number of branches from a node, and maximum depth of tree.

A decision tree model may include one or more branches and one or more items or leaves associated with the branches. In the example of FIG. 3, the decision tree model includes a hierarchy having five levels. The model can include a number of nodes and segments. According to certain aspects, a segment can refer to an item that is at the lowest level of hierarchy in the decision tree model, and a node may refer to an item that is at a level higher than the lowest level of hierarchy in the decision tree model (e.g., one level immediately above a segment). A segment may relate to one variable (e.g., matching engine variable), and a node may relate to a group of variables. In the example of FIG. 3, the items at the bottommost level are the segments 350, and the items at one level above the segments 350 are the nodes 340. In certain embodiments, the items or leaves in the decision tree model may also be referred to as "nodes."

Each item in the decision tree model can be associated with a particular characteristic or a group of particular characteristics for inquiries. The characteristic(s) may correspond to matching engine variables. Each item can specify the PER value for the associated characteristic(s). The system 100 can use classification rules to determine which item in the decision tree model should be assigned to a particular inquiry. Once the system 100 determines which item to assign to an inquiry, the system 100 can assign the PER value for the assigned item to the inquiry.

Now certain details relating to the process of applying the model to inquiries will be explained with reference to FIG. 3. In the example of FIG. 3, the system 100 receives two inquiries. The first inquiry relates to programs provided by an educational institution that provides HED. The second inquiry relates to programs provided by an educational institution that does not provide HED. In certain cases, educational institutions that provide historical enrollment data may be referred to as "Top n" institutions, and educational institutions that do not provide historical enrollment data may be referred to as "Non-Top n" or "Not Top n" institutions. For instance, Top 4 refers to four educational institutions that provide HED, and Not Top 4 refers to other educational institutions that do not provide HED.

The first inquiry is received from a social media channel, from a mobile device, and is for a campus course (e.g., as opposed to an online course). The first inquiry has the following attributes (among others): inquiry ID of 12345, Top 4, Social, Mobile, and Campus. The second inquiry is received from a social media channel, from a mobile device, and is for a desired enrollment timeframe of within 0-3 months. The second inquiry has the following attributes (among others): an inquiry ID of 45678, Not Top 4, Social, and 0-3 months.

The decision tree model in the example of FIG. 3 has items five levels of hierarchy. To facilitate explanation, each level will be referred to by numbers 1-5 from top to bottom. Each item specifies a PER value for a characteristic or a group of characteristics. Level 1 includes one item 310a. The item 310a is the topmost item in the decision tree model and is associated with any inquiry. The item 310a specifies the PER value for an inquiry as 0.015 (e.g., 1.5%). However, any initial PER value other than 1.5% may be used. In the example of FIG. 3, the PER value for an item is indicated by the variable pVinq. Level 2 includes two items 320a and 320b. The item 320a is associated with the characteristic "Top 4" and specifies the PER value as 0.02, and the item 320b is associated with the characteristic "Not Top 4" and specifies the PER value as 0.03. Level 3 includes four items 330a, 330b, 330c, and 330d. The items 330a and 330b relate to the item 320a. The item 330a is associated with the characteristic "Social & Display" and specifies the PER value as 0.03. "Social" can refer to a social media type, where ads would appear on a social media platform, such as, but not limited to, Facebook or Twitter. "Display" can refer to a media type that would include, but not be limited to, a media type where ads (e.g., banner ads, etc.) appear on particular websites, such as, but not limited to, on Yahoo.com, WSJ.com, AOL.com, etc. "Search" can refer to a search-engine media type, where ads would be appear, such as Google or MSN. The item 330b is associated with the characteristic "Search" and specifies the PER value as 0.01. Similarly, the items 330c and 330d relate to the item 320b and are associated with the characteristic "Social & Display" and "Search," Respectively. The items 330c and 330d specify the respective PER values. Level 4 includes the items 340a-g, and Level 5 includes the items 350a-h. In the example of FIG. 3, Level 5 only includes items for the branch from the item 320a. The items 340 are nodes, and the items 350 are segments.

In some embodiments, the system 100 assigns a segment 350a-h for inquiries for Top n institutions and assigns a node 340e-g for inquiries for Not Top n institutions. The system 100 can determine whether to assign a segment 350 or a node 340 for an inquiry based on which leads to better prediction results. For instance, assigning nodes to inquiries from Not Top n institutions may lead to better prediction results for PER values.

The system 100 can decide which branches of the decision tree model should apply to a particular inquiry by matching or comparing the attributes of the inquiry to the characteristics associated with the different items in the decision tree model. In the example of FIG. 3, the first inquiry (inquiry ID=12345) falls down the left side of the decision tree model at each level. The first inquiry is matched to the item 320a ("Top 4"), the item 330a ("Social & Display"), the item 340a ("Mobile"), and finally the item 350a ("Campus"). The second inquiry (inquiry ID=45678) falls down the right side of the decision tree at the first level, then the left side of the decision tree model for the rest of the levels. The PER value for the item 350a, which is 0.05, is assigned to the first inquiry as the predicted enrollment rate of the first inquiry. The PER value, or the forecast value, for a segment 350 may be represented by the variable FVseg. The second inquiry is matched to the item 320b ("Not Top 4"), the item 330c ("Social & Display"), and finally the item 340e ("0-3 Months"). The PER value for the item 340e, which is 0.04, is assigned to the second inquiry as the predicted enrollment rate of the second inquiry. The PER value, or the forecast value, for a node 340 may be represented by the variable FVnd. The predicted enrollment rate for the first inquiry and the predicted enrollment rate for the second inquiry can be used in determining the respective imputed revenue for the first inquiry and the second inquiry.

The system 100 can determine the predicted enrollment rate for the current or live inquiry data (e.g., inquiries received today) as well as historical inquiry data (e.g., inquiries received prior to today). For instance, when a new model is generated and deployed, it may be desirable to determine the predicted enrollment rate of older inquiry data using the new model. In one example, the system 100 applies the new model to inquiries received in the past seven days. In this way, the system 100 can determine the predicted enrollment rate for all relevant inquiries by applying the model.

In one embodiment, the following process is applied to generate the model: (1) accept user inputs, (2) establish timeframes for scoring historical data, (3) construct raw data sets for scoring historical data, (4) prepare data sets for scoring historical data, and (5) compute initial segment and node forecasts for scoring historical data. The same process can be applied to current data.

(1) Accept User Inputs

After the model is selected, the process for deployment is initiated by selecting time variables that will drive the data selection and manipulation for the scoring process. The variable Gap establishes the data for which the historical data is deemed to be complete with all possible partner transaction data being logged in the data sources. The variable ScDays is the days to which the daily scores are to be applied retroactively. The variable SF_ID is the first date to be applied for computing segment forecasts on historical data. The variable Forecast Timeframe Updating approach determines the forecast values applied to the daily scoring: Append—extending the date to make new data eligible for segment forecast; Roll—moving the dates to make new data eligible for segment forecast. The variable Replace establishes the number of days for which the forecast data can be applied and stored in the data stores.

(2) Establish Timeframes for Scoring Historical Data

The variable Segment Forecast Timeframe establishes the specific dates of data to be utilized in computing the forecast. The variable Historical Scoring Timeframe establishes the specific dates to which the scoring routine results may be applied.

(3) Construct Raw Data Sets for Scoring Historical Data

The raw data set process specifies the data, across a defined date range, to be used as inputs into the scoring routine. The RawSF_DS dataset, which includes variables from inquiries delivered to partners (e.g., organization or company) that provide transaction data, is used to compute the segment forecasts. The RawT/S_DS dataset, which includes variables from inquiries delivered to all partner types, is used to assign forecasts to all inquiries.

(4) Prepare Data Sets for Scoring Historical Data

The data preparation step involves eliminating incomplete or ineligible inquiries from both the RawSF_DS and RawT/S_DS datasets to ensure the scoring process has the required inputs. For the RawT/S_DS dataset, the process identifies eligible inquiries and assigns missing media values at the node level.

(5) Compute Initial Segment and Node Forecasts for Scoring Historical Data

The process for computing the initial forecasts produces a predicted value for each segment and node of the model. The forecast value for a segment is the predicted enrollment rate associated with a specific variable within the model. The forecast value for a node is the predicted enrollment rate associated with a specific grouping of variables within the model. Using historical enrollment data for determining forecast values, each inquiry qualifies for assignment to one segment and one node associated with a matching engine variable. For a newly deployed model, all inquiries may be assigned to a segment and a node. For an existing model, only new inquiries are assigned to a segment and a node based on the forecast timeframe status. The forecast value is computed as an average predicted enrollment rate for all the inquiries assigned as explained above. In one embodiment, forecast values for the different levels of the tree are determined by running historical data through an established mode.

Enrollment Rate Prediction

Figure 4:
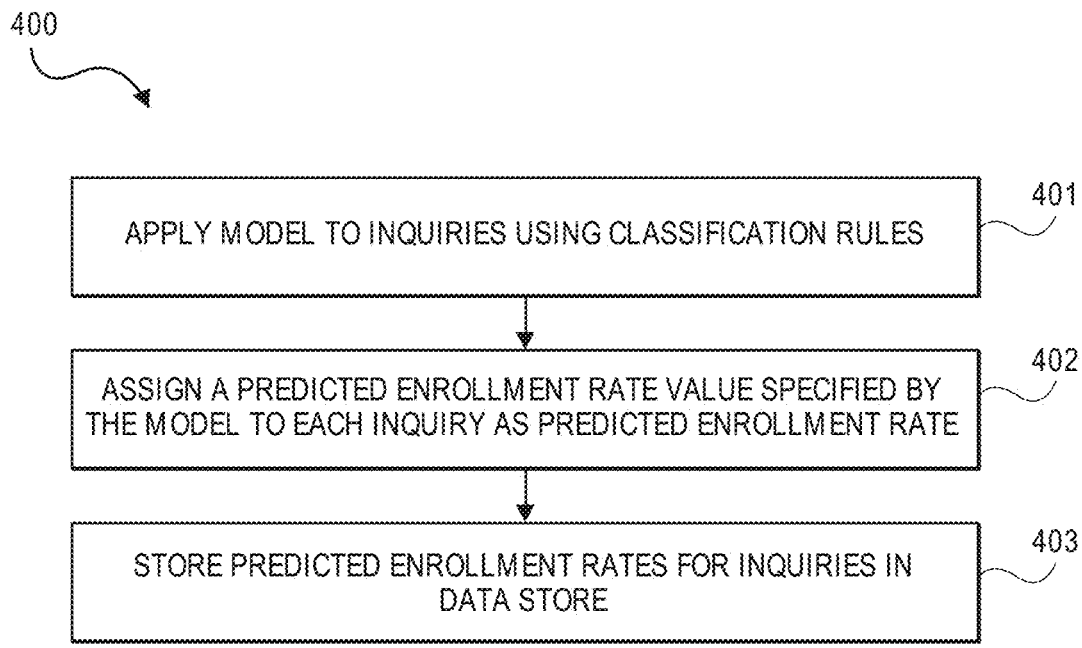
FIG. 4 illustrates a flowchart for determining predicted enrollment rates associated with inquiries, according to certain embodiments.

FIG. 4 illustrates a flowchart for determining predicted enrollment rates associated with inquiries, according to certain embodiments. The process 400 may be implemented by one or more systems described with respect to FIGS. 1 and 7. For illustrative purposes, the process 400 is explained below in connection with the system 100 in FIG. 1. For example, the enrollment rate prediction component 120 of the system 100 may perform the blocks for the process 400. Certain details relating to the process 400 are explained in more detail with respect to FIGS. 1-7. Depending on the embodiment, the process 400 may include fewer or additional blocks, and the blocks may be performed in an order that is different than illustrated.

At block 401, the system 100 applies a model to inquiries using classification rules. The model can specify PER values for various characteristics associated with inquiries. The classification rules can indicate how an inquiry should be categorized in the model so that a PER value is assigned to the inquiry. In one embodiment, the classification rules are established by the model.

At block 402, the system 100 assigns a predicted enrollment rate value specified by the model to each inquiry as the predicted enrollment rate. As a result of applying the model to an inquiry, each inquiry is assigned a PER value specified in the model, which indicates a likelihood of enrollment in a program. The system 100 may assign a PER value to current inquiries as well as past inquiries, as explained above.

At block 403, the system 100 stores the predicted enrollment rate for the inquiries in the data stores 140. For example, the predicted enrollment rates can be included in the enrollment rate prediction data 170 explained in connection with FIG. 1. The system 100 can specify how long the enrollment rate prediction data 170 should be stored in the data stores 140.

Imputed Revenue Determination

Figure 5:
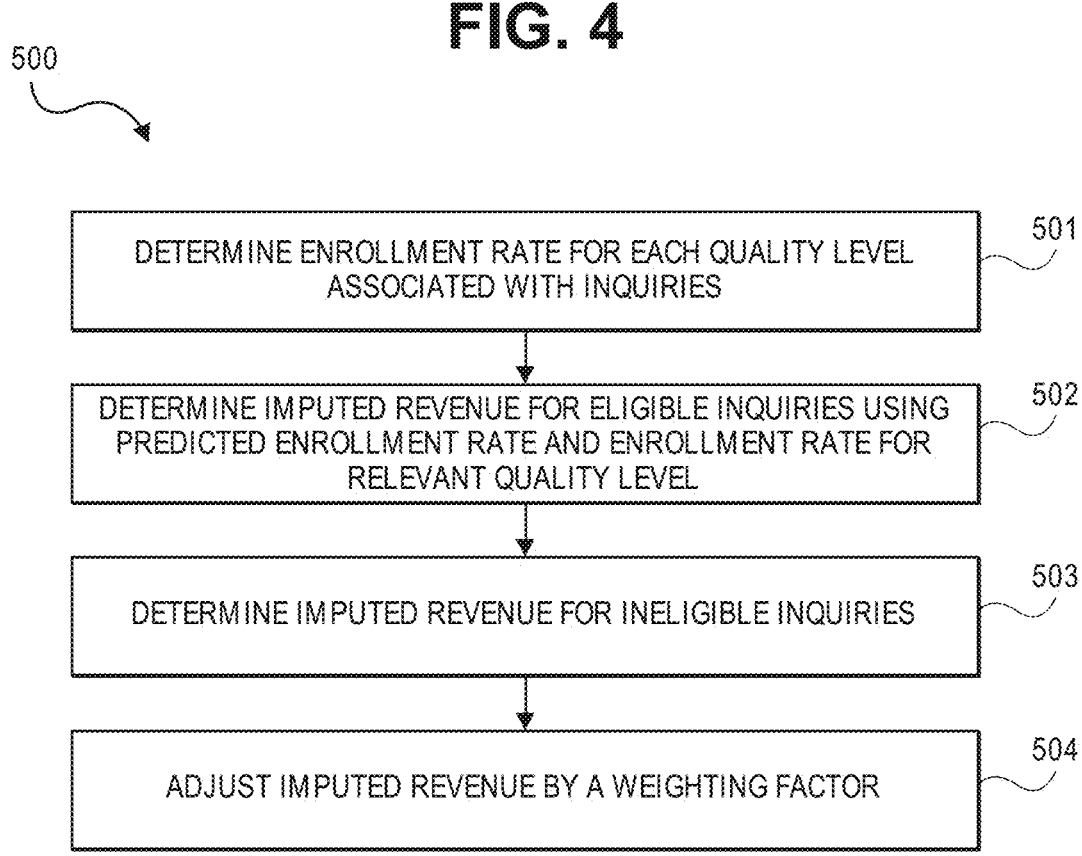
FIG. 5 illustrates a flowchart for determining imputed revenue associated with inquiries, according to certain embodiments.

FIG. 5 illustrates a flowchart for determining imputed revenue associated with inquiries, according to certain embodiments. The process 500 may be implemented by one or more systems described with respect to FIGS. 1 and 7. For illustrative purposes, the process 500 is explained below in connection with the system 100 in FIG. 1. For example, the imputed revenue component 130 of the system 100 may perform the blocks for the process 500. Certain details relating to the process 500 are explained in more detail with respect to FIGS. 1-7. Depending on the embodiment, the process 500 may include fewer or additional blocks, and the blocks may be performed in an order that is different than illustrated.

At block 501, the system 100 determines the enrollment rate for each quality level associated with inquiries. In some embodiments, the process of determining the imputed revenue uses the following input: inquiry ID, timeframe, date of computation, and enrollment rate for quality level at date. Timeframe refers to the time period for which imputed revenue should be calculated (e.g., preceding seven days). Date of computation refers to the date imputed revenue is calculated. Enrollment rate for quality level at date refers to the enrollment rate for a quality level on the date of computation.

As explained above, an inquiry may have a quality level associated with it, such as EQ-Undergraduate, EQ-Graduate, SP-Undergraduate, and SP-Graduate. In some embodiments, the system 100 computes the enrollment rate for the different quality levels based on historical enrollment rate for inquiries belonging to the respective quality levels. For instance, the system 100 averages historical enrollment rates for all inquiries belonging to EQ-Undergraduate over a particular timeframe. The system 100 can also average historical enrollment rates for all inquiries belonging to the other quality level categories. Accordingly, there will be an enrollment rate for the quality level EQ-Undergraduate, an enrollment rate for the quality level EQ Graduate, an enrollment rate for the quality level SP-Undergraduate, and an enrollment rate for the quality level SP-Graduate. These enrollment rates can be used in determining the imputed revenue as explained below. The system 100 may specify the quality level enrollment rates that should be used for computation of imputed revenue on a particular day, e.g., the date of computation.

At block 502, the system 100 determines the imputed revenue for eligible inquiries using the predicted enrollment rate and the enrollment rate for the relevant quality level. As mentioned above, eligible inquiries may refer to inquiries that have sufficient information for predicting enrollment rates. In certain embodiments, the imputed revenue for an eligible inquiry is derived as follows:

$$\text{Initial imputed revenue} = \text{revenue} * (\text{predicted enrollment rate}/\text{enrollment rate for quality level for date}) \quad (1)$$

Revenue can refer to an amount that is paid by an organization or a company for an inquiry. For example, an organization pays $2 per inquiry generated from an advertisement. Predicted enrollment rate can refer to the predicted enrollment rate determined for the inquiry by applying the model. Enrollment rate for quality level for date can refer to the enrollment rate for the quality level of the inquiry that is to be used on the date of computation of the imputed revenue. The imputed revenue calculated according to Equation 1 above may be referred to as the initial imputed revenue.

At block 503, the system 100 determines the imputed revenue for ineligible inquiries. As mentioned above, ineligible inquiries may refer to inquiries that are missing certain information used for predicting enrollment rates. Since ineligible inquiries do not provide sufficient information for predicting enrollment rates, actual revenue is assigned as the imputed revenue. For instance, if an organization pays $2 per inquiry, the imputed revenue for an ineligible inquiry is $2. This imputed revenue figure may be referred to as the initial imputed revenue.

At block 504, the system 100 adjusts the imputed revenue by a weighting factor. In one embodiment, the weighting factor is used to ensure that no revenue is lost, or unaccounted for. Imputed revenue may be used by media buyers to determine the best place to allocate media dollars in order to drive higher quality returns. For example, imputed revenue may be used to evaluate a "Return on Ad Spend" for each specific place an ad appears. Imputed revenue is associated with that "Return"—but it can be modified to reflect potential customer performance with prospective clients. The total imputed revenue should add up to be equal to the total actual revenue from providing the inquiries. Accordingly, the imputed revenue may be adjusted by a weighting factor such that the sum of eligible revenue and ineligible revenue adds up to a 100% of the actual revenue. According to certain aspects, the weighting factor may be referred to as "a true-up factor." In some embodiments, the weighting factor is determined as follows:

$$\text{weighting factor} = \frac{(\text{eligible revenue} + \text{ineligible revenue})}{\left(\begin{array}{c}\text{eligible initial imputed revenue} + \\ \text{ineligible initial imputed revenue}\end{array}\right)} \quad (2)$$

Eligible revenue may refer to total actual revenue for all eligible inquiries. Ineligible revenue may refer to total actual revenue for all ineligible inquiries. Eligible initial imputed revenue may refer to total initial imputed revenue for all eligible inquiries. Ineligible initial imputed revenue may refer to total initial imputed revenue for all ineligible inquiries.

The weighting factor may be calculated for each day and applied to inquiries generated that day. The weighting factor is applied to the initial imputed revenue for each inquiry. The weighting factor can ensure there is proper allocation of imputed revenue across all inquiries. The total imputed revenue and the total actual revenue can be the same such that the revenue is not misrepresented to organizations or companies.

The system 100 determines the final imputed revenue for an inquiry as follows:

$$\text{Final imputed revenue} = \text{initial imputed revenue} * \text{weighting factor} \quad (3)$$

As mentioned above, the imputed revenue can be determined for a particular day's inquiries as well as past inquiries. The system 100 can use appropriate quality level enrollment rates, weighting factors, etc. for the relevant day.

In one embodiment, the system 100 prepares all the data required for imputed revenue computations. The initial imputed revenue is computed daily for each inquiry by bringing together the revenue, predicted enrollment rate from the model and known historical enroll rate. The computation is applied to all inquiries generated during the preceding 7 days. For eligible inquiries, computing the initial imputed revenue is arrived at by dividing the predicted enrollment rate by the actual enroll rate for each quality level, and then multiplying the result by the revenue. Inputs into the imputed revenue computation include:

$ER_{dc,\ ql}$=enrollment rate (ER) for a specific date (dc) for 4 quality levels (ql):
1. SP-Undergraduate (SPU)
2. SP-Graduate (SPG)
3. EQ-Undergraduate (EQU)
4. EQ-Graduate (EQG)

Each quality level can have distinctly different enrollment rate performance based on media source and type of education level interest (e.g., undergraduate, graduate, etc.). For ineligible inquiries, the predicted enrollment rate is null, and the initial imputed revenue is arrived at by simply using the revenue associated with that inquiry.

As explained above, purchase and/or allocation of advertisements can be decided or modified based on the imputed revenue for the inquiries. For example, if an organization or company is requesting to receive leads (e.g., inquiries) belonging to a particular quality level (e.g., "EQ-Undergraduate"), leads that have imputed revenue sufficient for that quality level can be identified and delivered to the organization or company. In one embodiment, the system 100 delivers a subset of leads that maximizes the imputed revenue from inquiries. Also, advertisements can be distributed in media channels that are more likely to get inquiries having similar characteristics or attributes as inquiries having sufficient imputed revenue for the quality level. For instance, more advertisements are purchased for media channels that resulted in high imputed revenue. Predicted enroll rate is one measure of quality. However, it can be undesirable for media buyers to use a 60-day old, historical percentage to determine how to allocate spend. Media buyers are used to working in a system where they are rewarded for driving revenue immediately—they cannot wait for data to make daily decisions. Media buyers need a metric that reflects a predicted value of what they did yesterday in order to influence their decisions today. By having a two metrics, real revenue and imputed revenue, they can see firsthand that every dollar earned doesn't have the same long term value for their organization. A media buyer could spend their whole budget on low cost media that drives a lot of inquiries—but if none of those inquiries close (or turn into a sale), it hurts their business.

Method of Determining Imputed Revenue

Figure 6:
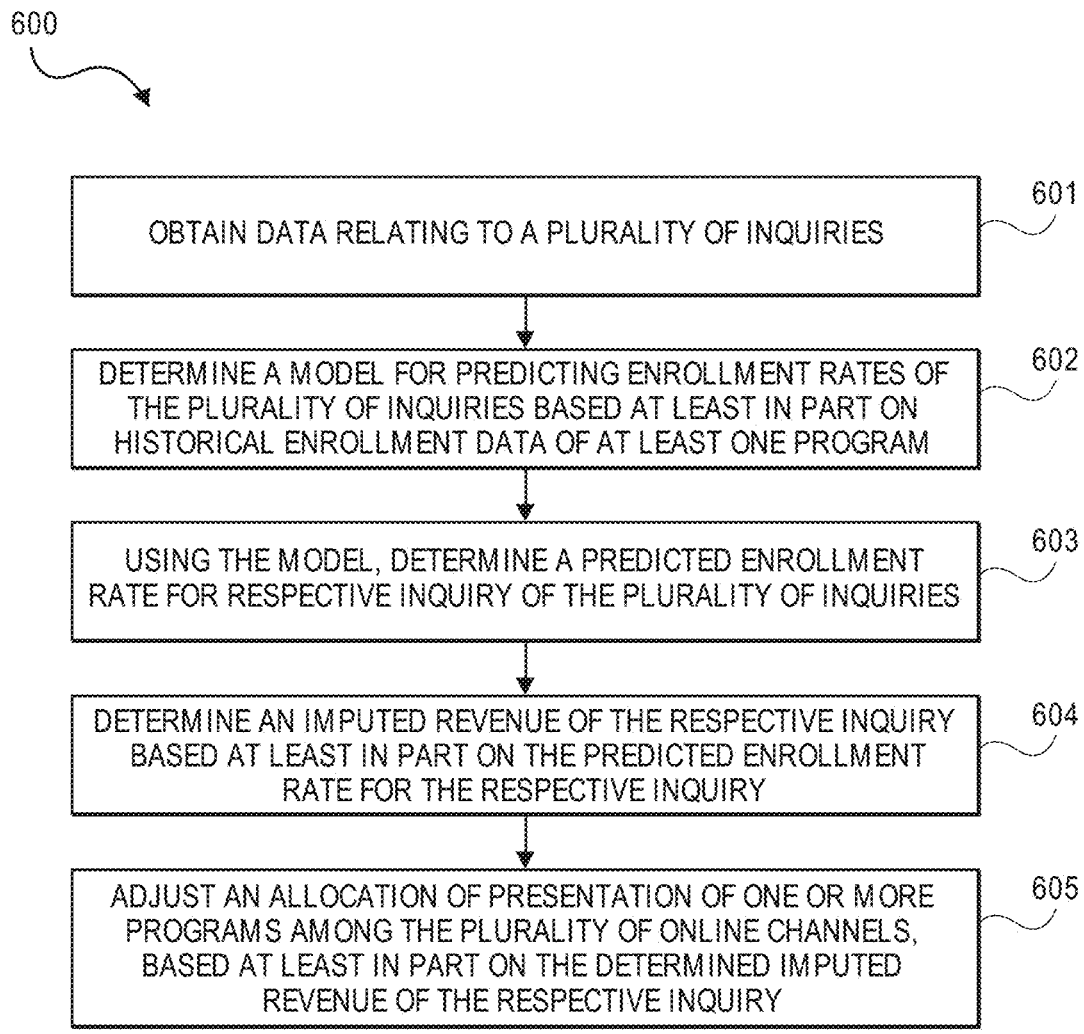
FIG. 6 illustrates a flowchart for determining imputed revenue, according to certain embodiments.

FIG. 6 illustrates a flowchart for determining imputed revenue, according to certain embodiments. The process 600 may be implemented by one or more systems described with respect to FIGS. 1 and 7. For illustrative purposes, the process 600 is explained below in connection with the system 100 in FIG. 1. Certain details relating to the process 600 are explained in more detail with respect to FIGS. 1-7. Depending on the embodiment, the process 600 may include fewer or additional blocks, and the blocks may be performed in an order that is different than illustrated.

At block 601, the system 100 obtains data relating to a plurality of inquiries. Each of the plurality of inquiries can be indicative of a request for information about one or more educational programs providing a service. Each of the plurality of inquiries may be received from a particular channel of a plurality of online channels for presenting the one or more programs (e.g. online channels for displaying advertisements, such as social media, search engines, etc.). The plurality of inquiries may be represented using one or more data structures in one or more data sources 140.

At block 602, the system 100 determines a model for predicting enrollment rates of the plurality of inquiries based at least in part on historical enrollment data of at least one program of the one or more programs. The model can specify a predicted enrollment rate value for one or more characteristics associated with the plurality of inquiries. For example, the model specifies the predicted enrollment rate value for a particular characteristic associated with the plurality of inquiries or the predicted enrollment rate value for a group of characteristics associated with the plurality of inquiries. The characteristic(s) may correspond to a matching engine variable as explained above. In certain embodiments, the historical enrollment data of the at least one program is available up to a first time and the imputed revenue of the respective inquiry is determined at a second time, wherein the second time is later than the first time. For example, there is a gap between the date of computation of the imputed revenue and the date up to which the historical enrollment data is complete.

In one embodiment, the model is a decision tree model (such as shown in FIG. 3) including a plurality of items, each of the plurality of items associated with one or more characteristics of the plurality of inquiries, each of the plurality of items specifying respective predicted enrollment rate value for the associated one or more characteristics. The system 100 may assign the respective inquiry to one item in the decision tree model, and assign the predicted enrollment value specified by the one item as the predicted enrollment rate of the respective inquiry. The system 100 can assign the respective inquiry to the one item based at least in part on classification rules associated with the model.

In certain embodiments, the plurality of items can include a plurality of nodes and a plurality of segments, wherein each node specifies the predicted enrollment rate value for a group of characteristics associated with the plurality of inquiries, wherein each segment specifies the predicted enrollment rate value for a particular characteristic associated with the plurality of inquiries, and wherein the plurality of nodes are at a higher level in the decision tree model than the plurality of segments. In some embodiments, historical enrollment data is available for a first program of the one or more programs, and historical enrollment data is not available for a second program of the one or more programs, and the system 100 assigns a segment of the plurality of segments to a first inquiry associated with the first program and assigns a node of the plurality of nodes to a second inquiry associated with the second program. The system 100 assigns the predicted enrollment rate value specified by the assigned segment as the predicted enrollment rate of the first inquiry and assigns the predicted enrollment rate value specified by the assigned node as the predicted enrollment rate of the second inquiry.

At block 603, the system 100, using the model, determines a predicted enrollment rate for respective inquiry of the plurality of inquiries. As explained above, the predicted enrollment rate can be the predicted enrollment rate value specified by an item in the decision tree model.

At block 604, the system 100 determines an imputed revenue of the respective inquiry based at least in part on the predicted enrollment rate for the respective inquiry. The imputed revenue may be indicative of a potential revenue that can be generated from the respective inquiry. In some embodiments, each of the plurality of inquiries is associated with a quality level indicative of a likelihood of enrollment in a program, and the quality level has an enrollment rate associated with the quality level. In one embodiment, the system 100 determines the imputed revenue of the respective inquiry based on an actual revenue associated with the respective inquiry, the predicted enrollment rate of the respective inquiry, and the enrollment rate of the quality level associated with the respective inquiry.

At block 605, the system 100 adjusts an allocation of presentation of the one or more programs among the plurality of online channels, based at least in part on the determined imputed revenue of the respective inquiry.

Implementation Mechanisms

According to one embodiment, the techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
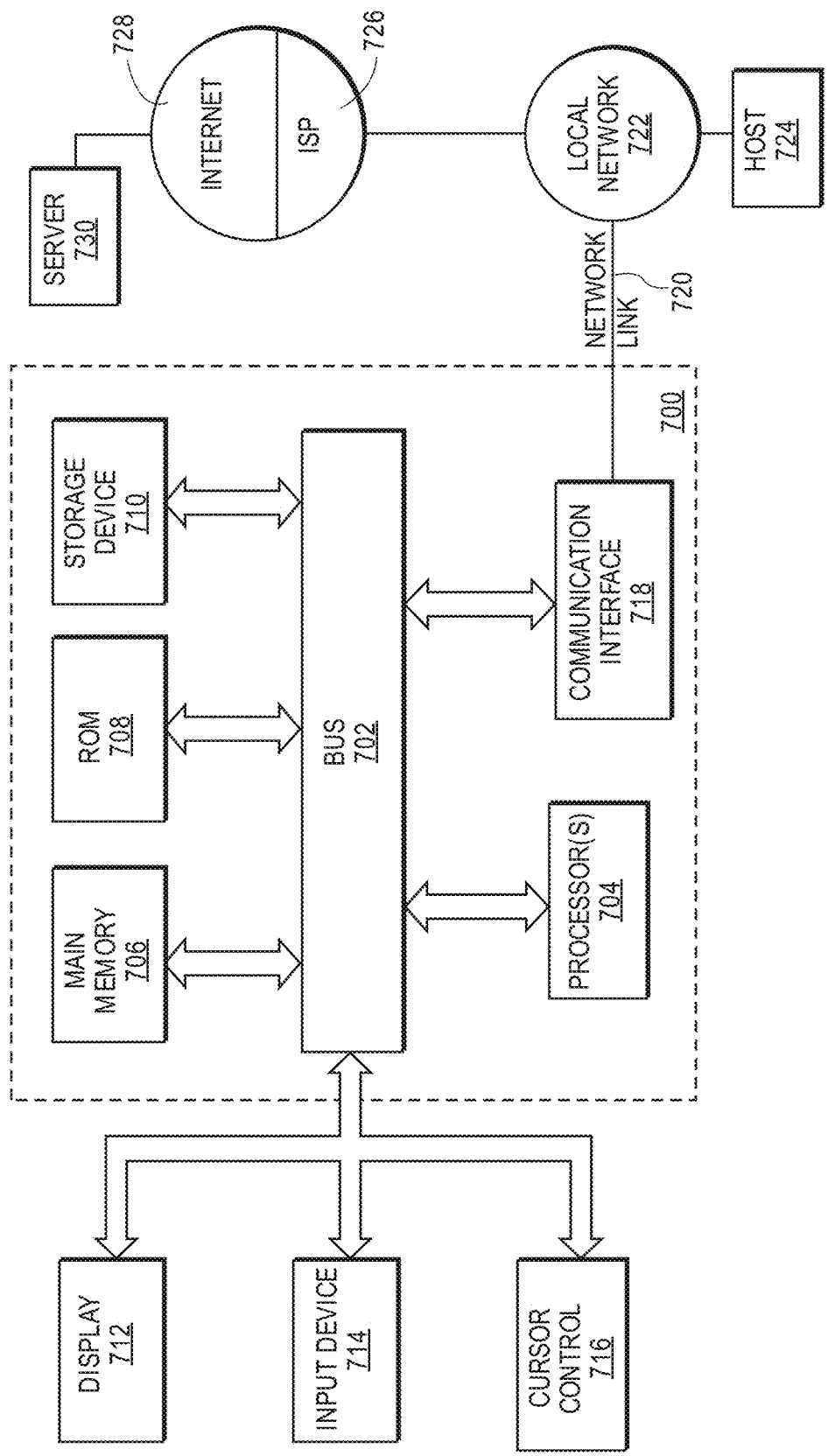
FIG. 7 illustrates a computer system with which certain methods discussed herein may be implemented.

For example, FIG. 7 shows a block diagram that illustrates a computer system 700 upon which an embodiment may be implemented. For example, the computing system 700 may comprise a system for determining predicted enrollment rates and imputed revenue for inquiries. Other computing systems discussed herein may include any portion of the circuitry and/or functionality discussed with reference to system 700. For instance, the system 100 can each include some or all of the components and/or functionality of the system 700.

Computer system 700 includes a bus 702 or other communication mechanism for communicating information, and a hardware processor, or multiple processors, 704 coupled with bus 702 for processing information. Hardware processor(s) 704 may be, for example, one or more general purpose microprocessors configured with specific instructions, such as to implement any of the methods or processes described above.

Computer system 700 also includes a main memory 706, such as a random access memory (RAM), cache and/or other dynamic storage devices, coupled to bus 702 for storing information and instructions to be executed by a processor 704. Main memory 706 also may be used for storing temporary variables or other intermediate information during execution of instructions to be executed by the processor 704. Such instructions, when stored in storage media accessible to processor the 704, render computer system 700 into a special-purpose machine that is customized to perform the operations specified in the instructions.

Computer system 700 further includes a read only memory (ROM) 708 or other static storage device coupled to bus 702 for storing static information and instructions for the processor 704. A storage device 710, such as a magnetic disk, optical disk, or USB thumb drive (Flash drive), etc., is provided and coupled to bus 702 for storing information and instructions.

Computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware.

Generally, the modules described herein refer to logical modules that may be combined with other modules or divided into sub-modules despite their physical organization or storage.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicate with a WAN). Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A method comprising:
    accessing inquiry data associated with a plurality of online inquiries from users, wherein the inquiry data includes historical enrollment data associated with the plurality of online inquiries;
    determining, based at least in part on the inquiry data, a first model for predicting enrollment rates of inquiries by automatically testing a plurality of models by:
        running at least a portion of the inquiry data through each of the plurality of models to determine a predictive accuracy; and
        identifying the first model as having a highest predictive accuracy of the plurality of models;
    identifying historical enrollment data associated with prior inquiries received within a first time period, wherein the first time period is based at least in part on how long it takes for the historical enrollment data to become complete by including actual enrollment data;
    determining, using the historical enrollment data, predicted enrollment rates for the prior inquiries received within the first time period;
    updating the first model to create an updated first model based at least in part on the predicted enrollment rates for the prior inquiries;
    accessing a new inquiry associated with a first user device received within a second time period, wherein the second time period includes fewer days than the first time period;
    applying the updated first model to inquiry data associated with the new inquiry to determine a predicted enrollment rate for the new inquiry;
    determining, based at least in part on the predicted enrollment rate for the new inquiry, an imputed revenue associated with the new inquiry, wherein the imputed revenue indicates a potential revenue that can be generated from the new inquiry;
    automatically adjusting, based on the imputed revenue, an allocation of advertisements among a plurality of online delivery channels, and based at least in part on the adjusting of the allocation, initiating display updates for presenting at least one product, service, or program among the plurality of online delivery channels; and
    initiating delivery of the display updates to the first user device.

2. The method of claim 1, wherein applying the updated first model to the inquiry data is based at least in part on classification rules, wherein the classification rules indicate how the new inquiry should be categorized in the updated first model so that the predicted enrollment rate is assigned to the inquiry data associated with the new inquiry wherein the predicted enrollment rate indicates a likelihood of enrollment.

3. The method of claim 2, further comprising:
    generating or updating the classification rules based at least in part on the updated first model.

4. The method of claim 1, wherein each of the plurality of online inquiries is associated with a quality level indicative of a likelihood of enrollment in a program.

5. The method of claim 4, wherein the quality level has an enrollment rate associated with the quality level.

6. The method of claim 1, wherein the plurality of online inquiries is associated with one or more products, services, or programs.

7. The method of claim 1, wherein the plurality of models includes at least two of: a decision tree model, a random forest model, a regression model, a classification model, a regression tree model, or a neural network.

8. The method of claim 1, wherein the updated first model is a decision tree model comprising a plurality of items, each of the plurality of items associated with one or more characteristics of the plurality of online inquiries, each of the plurality of items specifying respective predicted enrollment rate values for the associated one or more characteristics.

9. The method of claim 8, wherein the plurality of items comprises a plurality of nodes and a plurality of segments, wherein each node specifies a predicted enrollment rate value for a group of characteristics associated with the plurality of online inquiries, wherein each segment specifies the predicted enrollment rate value for a particular characteristic associated with the plurality of online inquiries, and wherein the plurality of nodes are at a higher level in the decision tree model than the plurality of segments.

10. The method of claim 1, wherein the plurality of online delivery channels includes one or more of: social media or search engine.

11. The method of claim 1, further comprising:
access updated historical enrollment data indicating updates to the historical enrollment data of at least one of the plurality of online inquiries; and
determine, based at least in part on the updated historical enrollment data and the updated first model, a newly updated model for predicting enrollment rates of inquiries, wherein applying the updated first model to inquiry data associated with the new inquiry comprises applying the newly updated model to inquiry data associated with the new inquiry.

12. The method of claim 1, wherein the first time period includes one of: (1) a roll window or fixed period of time, or (2) an append window or increasing period of time.

13. A system comprising:
one or more computer readable storage devices configured to store computer executable instructions;
one or more hardware computer processors in communication with the one or more computer readable storage devices to execute the computer executable instructions to cause the system to:
access inquiry data associated with a plurality of online inquiries from users, wherein the inquiry data includes historical enrollment data associated with the plurality of online inquiries;
determine, based at least in part on the inquiry data, a first model for predicting enrollment rates of inquiries by automatically testing a plurality of models by:
running at least a portion of the inquiry data through each of the plurality of models to determine a predictive accuracy; and
identifying the first model as having a highest predictive accuracy of the plurality of models;
identify historical enrollment data associated with prior inquiries received within a first time period, wherein the first time period is based at least in part on how long it takes for the historical enrollment data to become complete by including actual enrollment data;
determine, using the historical enrollment data, predicted enrollment rates for the prior inquiries received within the first time period;
update the first model to create an updated first model based at least in part on the predicted enrollment rates for the prior inquiries;
access a new inquiry associated with a first user device received within a second time period, wherein the second time period includes fewer days than the first time period;
apply the updated first model to inquiry data associated with the new inquiry to determine a predicted enrollment rate for the new inquiry;
determine, based at least in part on the predicted enrollment rate for the new inquiry, an imputed revenue associated with the new inquiry, wherein the imputed revenue indicates a potential revenue that can be generated from the new inquiry;
automatically adjust, based on the imputed revenue, an allocation of advertisements among a plurality of online delivery channels, and based at least in part on the adjusting of the allocation, initiating display updates for presenting at least one product, service, or program among the plurality of online delivery channels; and
initiate delivery of the display updates to the first user device.

14. The system of claim 13, wherein applying the updated first model to the inquiry data is based at least in part on classification rules, wherein the classification rules indicate how the new inquiry should be categorized in the updated first model so that the predicted enrollment rate is assigned to the inquiry data associated with the new inquiry wherein the predicted enrollment rate indicates a likelihood of enrollment.

15. The system of claim 14, further comprising:
generating or updating the classification rules based at least in part on the updated first model.

16. The system of claim 13, wherein each of the plurality of online inquiries is associated with a quality level indicative of a likelihood of enrollment in a program.

17. The system of claim 13, wherein the quality level has an enrollment rate associated with the quality level.

18. The system of claim 13, wherein the plurality of models includes at least two of: a decision tree model, a random forest model, a regression model, a classification model, a regression tree model, or a neural network.

19. The system of claim 13, wherein the updated first model is a decision tree model comprising a plurality of items, each of the plurality of items associated with one or more characteristics of the plurality of online inquiries, each of the plurality of items specifying respective predicted enrollment rate values for the associated one or more characteristics.

20. The system of claim 13, wherein the plurality of online delivery channels includes one or more of: social media or search engine.

* * * * *